Dec. 2, 1952     R. G. PIETY     2,619,830

DETONATION METER

Filed Sept. 13, 1948     2 SHEETS—SHEET 1

INVENTOR
R.G. PIETY
BY Hudson and Young
ATTORNEYS

Patented Dec. 2, 1952

2,619,830

UNITED STATES PATENT OFFICE 2,619,830

DETONATION METER

Raymond G. Piety, Bartlesville, Okla., assignor to Phillips Petroleum Company, a corporation of Delaware Application September 13, 1948, Serial No. 49,082

2 Claims. (Cl. 73—35)

This invention relates to electrical measurement of physical forces, and it has particular relation to the measurement of peak values, and alternatively of average values, of the knocks caused by detonation of a fuel and air mixture in an internal combustion engine.

This application is related to my prior application Serial No. 503,166, filed September 20, 1943, now Patent No. 2,448,322, and entitled "Detonation Meter."

The primary object of my invention is to replace or supplement the human ear used in the prior art to determine when knocking is taking place by a standard electronic device not subject to human differences between individuals, nor human error, by providing suitable methods and apparatus.

Another important object is to provide an electronic device which will not only detect knocking but will give the degree of knock intensity.

Another object is to provide a detonation meter that will give the degree of knock intensity as a reading of the peak knock intensity during a short period.

Another object is to provide a detonation meter that will give the degree of knock intensity as an average of the knock intensity over a short period.

A further object is to accomplish the above listed objects without introducing any new factors into the prior art rating of the fuel but merely remove the variations introduced by the use of the variable human ear.

In the prior art the testing of fuels for knocking was done in a test engine, the knocking being listened for by ear in conjunction with observations on a cathode ray tube of the rate of change of pressure in the cylinder. This important test should not be made relying so much on the ear due to the impossibility of standardizing hearing in human beings. By substituting an electronic device, not only is more acute "hearing" obtained but the "hearing" is absolutely standardized so that different individuals running the test, or the same person on different days, will get identical results even though their hearing may vary greatly from time to time. The human ear cannot judge the absolute intensity of knocking. My electronic device can grade the knocking as to degree in an accurate manner.

Other objects are to provide methods and apparatus useful in signalling and indicating.

Numerous other objects will be apparent to those skilled in the art upon reading the accompanying specification and claims and studying the drawings.

Figure 1:
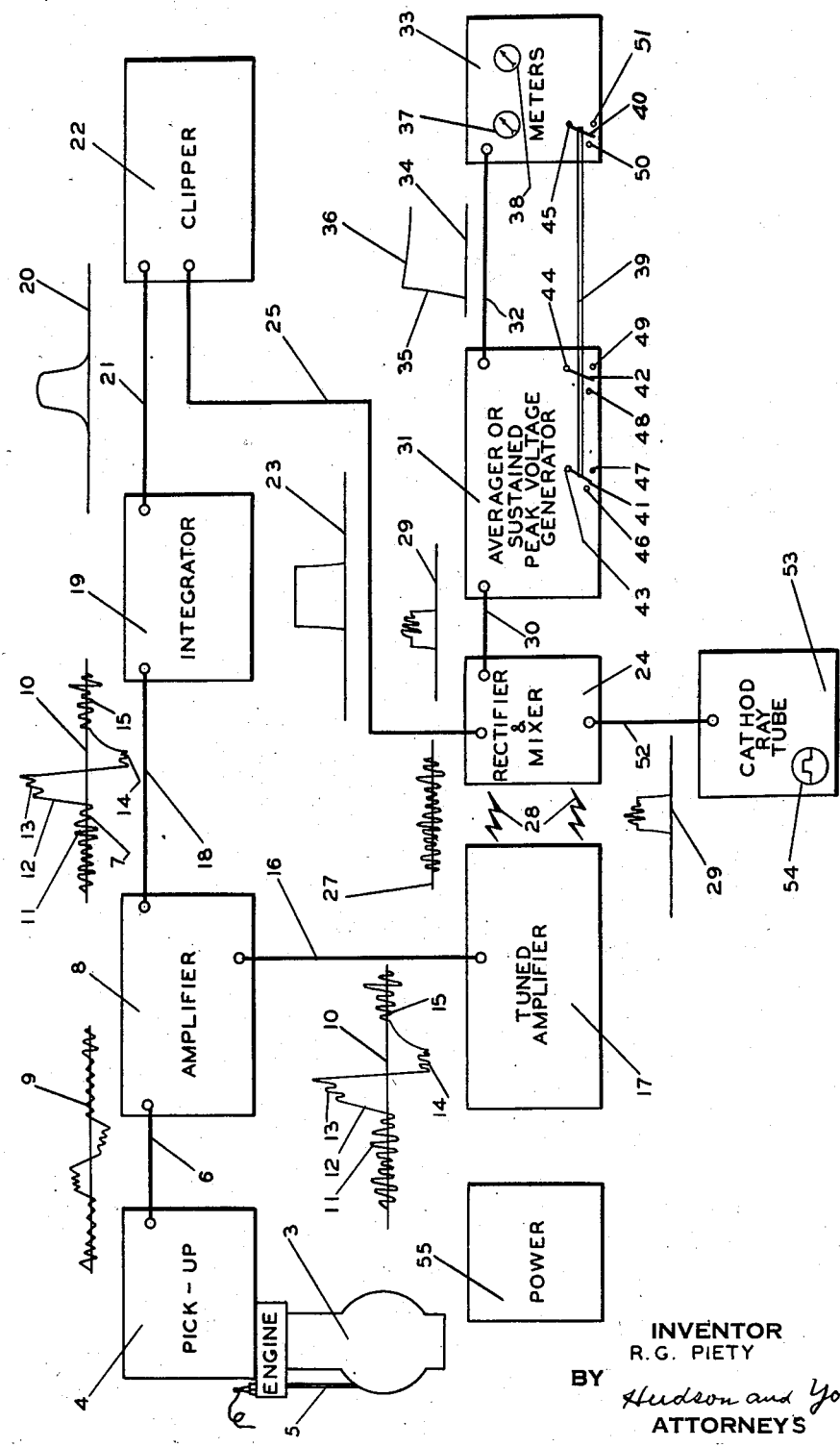
Figure 1 is a schematic diagram of the functional units of an illustrative embodiment of my invention, with voltage-time diagrams of the currents carried by wires between the units shown near their respective wires.

Before discussing the detonation or knock meter itself, a brief description of the theory of knock will be outlined to give the basis for the reasoning back of the design. Knocking occurs when an explosive gas mixture forms, is ignited and detonates in an engine cylinder, and large differences in pressure are generated within the cylinder. These pressure differences are propagated as sound waves within the cylinder and they are reflected back and forth until their energy is dissipated by adsorption and transmission through the cylinder walls. If the pressure of the gas in the cylinder is measured by some type of pressure indicator, it will be found that the effect of these reflections back and forth within the cylinder and also within the solid walls is to select out of the original exciting pressures short trains of superposed damped sine waves. The frequency of oscillation of each of the damped sine waves corresponds to one of the modes of vibration of the system.

There are a great many modes in a system like a test engine. In the case of my detonation meter, I use the modes with frequencies between 12,000 and 17,000 cycles. The ping which is heard when the engine is knocking is nothing more than the sound generated by the excitation of some of these normal modes between 12,000 and 17,000 cycles.

In the case of a test engine, the normal modes have rather high frequencies of oscillation, and it turns out that in order to generate a pressure variation with appreciable energy at these frequencies, a very rapid rise in pressure is required. The presence of mechanical oscillations of high frequency (several thousand cycles per second) is therefore an indication of a rapid rise in pressure in the cylinder. This rapid rise of pressure is also an indication of knocking, and it is this rapid pressure change that generates the voltage in the pickup 4 of my device. The more rapid the rise of pressure, the more violent the knock and the greater the voltage generated by the pickup, so I thereby determine the degree of knock intensity from the rate of pressure rise.

In spite of the complexity of the relation between the pressure changes in the cylinder and the acoustic and mechanical vibrations set up, it has been observed that the intensity of the knock under controlled conditions can be used to compare one fuel with another.

There are several pressure sensitive devices which are able to transform the pressure variations within an engine cylinder to a corresponding electrical voltage. I have been using a very satisfactory magneto-striction type indicator manufactured by the Standard Oil Company of California the voltage output of which is substantially proportional to the rate of change of pressure. This indicator has been used in the prior art in conjunction with an amplifier and a cathode-ray tube to give a visual pattern of the pressure variations in the cylinder. The presence of knock is clearly indicated by the pattern on the cathode ray screen, but it is difficult to observe the intensity of the knock, and impossible in testing practice to measure its value. Knock intensity is best measured by my present invention.

In order to use a meter deflection to measure the intensity of the knock, it is necessary to remove the effect of valve clatter which also sets up high frequency vibration of the cylinder walls and electro-magnetic waves from the spark plug which generate "static" currents in the wires of the meter. Fortunately the valve clatter and ignition spark occur at different times than the detonation so that by an electronic switching action it is possible to remove the effect of valve clatter and ignition spark. After removing the effects of valve clatter and spark, the question remains as to how the meter should be made to respond to the output of the indicator. The combustion cycles of the test engine are extremely variable. When tests are made by ear the presence of an audible knock once every thirty combustion cycles is considered to indicate knock. Observation of the cathode ray pattern showed that intermediate cycles might only indicate an intensity of ten per cent of the knocking cycle.

I may measure the time average knock intensity, or a time average where the weight given to a knock of any given intensity is proportional to some suitable function of the knock intensity, and/or the time elapsed in each cycle.

For example, when using an averaging meter 38 shown in Figure 1, the meter deflection is made to average the knock intensity over a short period of time, giving the same weight to all knocks.

I preferably employ a meter 37 shown in Figure 1 which is designed to give an indication of the peak knock intensity. This has been accomplished by using a high speed critically damped meter in conjunction with an electronic circuit which would prolong the peak voltage due to knock just sufficient to make it easy to read the maximum meter deflection. This gives a meter which will follow the variations in knock intensity and clearly show the statistical fluctuations between combustion cycles. The sensitivity of the meter is adjusted so that a deflection in the middle of the scale corresponds to audible knock and with the action just described this deflection in effect corresponds to a "calibrated ear."

In Figure 1, a test engine 3 is provided with a pickup 4, preferably a pressure indicator pickup of the magneto-striction type manufactured by the Standard Oil Company of California. This pickup translates the pressure changes within the cylinder of the engine 3 to electrical energy by virtue of the change in the reluctance of a magnetic path caused by movement of a small diaphragm (not shown) in the cylinder wall, the voltage output being directly proportional to the rate of change in pressure. Internal combustion engines are almost always provided with poppet valves (see valve stem 5) and these poppet valves clatter in closing causing knock-type vibrations, and due to inertia of parts in the pickup 4 these spurious "pressure change" knock-type valve clatter vibrations are picked up too. The spark of ignition also sends out an electro-magnetic field which generates spurious "pressure change" currents in the pickup network of wires.

All the output of the pickup, regardless of its source is transmitted along a cable 6 to an amplifier 8, and the shape of the wave transmitted along the cable 6 is shown roughly by a diagram 9 in which time is plotted in a horizontal direction (from left to right) and voltage in a vertical direction (above the line being positive and below the line negative). (This wave is better seen in a diagram 10 after amplification.) As to be seen in the diagram 10, there is a train of small amplitude waves consisting of spurious "pressure change" waves which are really intake valve clatter 11, ignition spark waves 7 and other vibrations it is not desired to finally indicate, then a high rate of pressure change wave 12 of large amplitude which is caused by the explosion of gas and resulting pressure rise and fall during the power stroke. On the crests of this pressure change wave are the minor pressure change variations 13 and 14 which indicate the presence and degree of knocking. Variations 15 are exhaust valve clatter during the closing of the exhaust valve.

The exact shape of 7, 11, 13, 14, and 15 cannot be shown as 12,000 to 17,000 cycles per second would just be a blur using the scale employed in the drawings.

This wave train is amplified in its entirety in the amplifier 8 and is transmitted through a cable 16 to a tuned amplifier 17. The shape of the amplified wave is shown by the diagram 10, all of these diagrams being similar to the diagram 9 as to time and voltage relations, each base line starting and ending at the same point in the engine cycle.

Cables 6 and 16 in combination with the ground form channels for the waves, and therefore the cables in Figure 1 can all be referred to as channels.

The same amplified wave train 10 is transmitted along a channel 18 to an integrator 19. The integrator integrates and modifies the wave train of the diagram 10 into a pulse of the general shape shown in a diagram 20 and this pulse is transmitted along a channel 21 to a clipper 22. The clipper 22 squares up the pulse into the substantially square pulse shown in a diagram 23. The degree of squareness can be varied to any extent considered necessary and the ignition wave 7 even if encroaching on slope 12 will be outside of the square pulse after clipping. This square pulse is transmitted from the clipper 22 to rectifier and mixer 24 by a channel 25.

The tuned amplifier 17 preferably amplifies the waves shown in the diagram 10 that constitute a pass band of about 12,000 to 17,000 cycles per second. This amplified pass band 27 is to be combined with the square pulses shown in the diagram 23 in the mixer portion of the rectifier and mixer 24 and is transmitted to the rectifier and mixer by an electro-magnetic field forming a channel represented by spark symbols 28.

In the rectifier and mixer 24, the wave trains 27 and 23 are combined to form the wave train shown in a diagram 29. This combined wave train is sent over a channel 30 to a network 31 which either averages or generates a sustained peak voltage depending on the position of a switch 39.

The averager or sustained peak voltage generator 31 operates to transmit a voltage over a channel 32 to a meter box 33 having the general wave form of a diagram 34, in which a rapid rise 35 is followed by a relatively slow exponential decay 36. Actually a composite wave is formed as a series of these waves 34 are superposed on each other at short intervals.

The meter box 33 contains two meters 37 and 38, 37 being a peak voltage meter and 38 an average voltage meter. A gang switch composed of an electrically nonconductive control rod 39 and single pole double throw switches 40, 41 and 42 may be provided to switch (by switch 40) from the meter 37 to 38 and to switch (by switches 41 and 42) the generator 31 from sustained peak voltage generation for the meter 37 to generation of voltages proportional to those of wave 29 for averaging by the meter 38. Contacts 43 to 51, inclusive, are provided for the switches.

Figure 2:
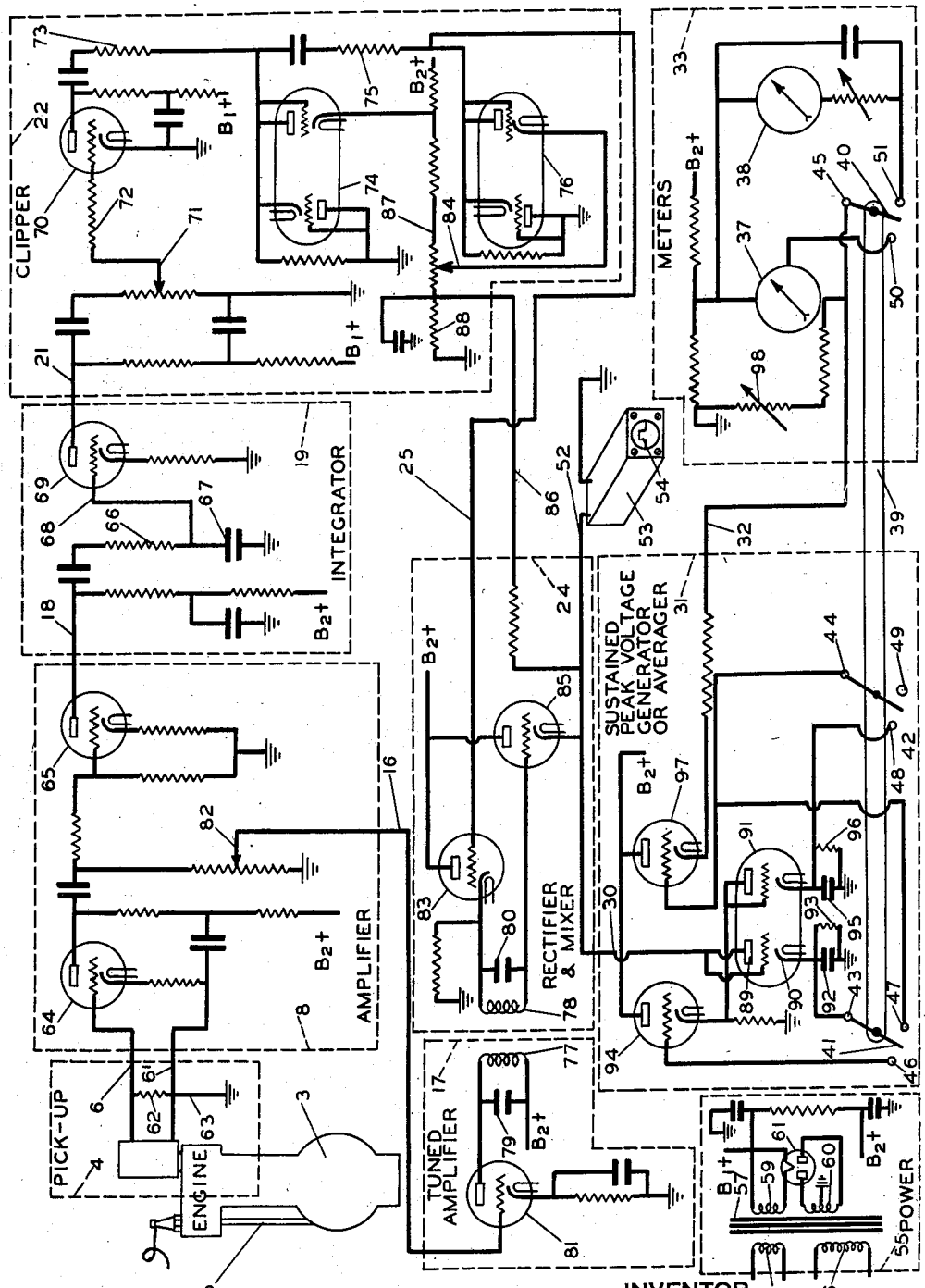
Figure 2 is an electrical wiring diagram showing in symbols the wiring of the device illustrated in Figure 1.

Figure 2 shows a wiring diagram of an illustrative embodiment of my invention.

Any power supply means may be employed at 55 for supplying the tubes with the type current they require. For illustration, I show a transformer receiving house current at 56, having a core 57, coils 58, 59 and 60 and a rectifier 61, but any other power supply can be employed just as well.

In the pickup 4, a grid leak 62 of 1.0 meg. between wires 6 and 6' and a ground 63 for the wire 6' is provided. This grid leak and ground could be regarded as part of the amplifier also, as they control the grid of tube 64 and prevent excessive plate to cathode currents, the exact dividing line between elements having certain functions being of course vague, although the elements and their functions are not vague. While I have shown certain dotted lines around "units" in Figure 2, it should be understood a certain latitude exists as to exactly what elements constitute each unit.

The amplifier 8 shows two triode tubes 64 and 65, for simiplicity but I may use a single double triode tube in place of these two tubes. The amplifier 8 is shown as a conventional resistance coupled amplifier. Any other type amplifier could be substituted.

The integrator 19 preferably contains a resistance 66 of about 0.5 meg. in series with a condenser 67 of about .25 mfd. By electric circuit theory the voltage between a wire 68 and the ground is substantially the integral of the signal from the wire 18. This voltage drop across the condenser 67 is impressed on a grid wire 68 of a triode 69. Again I may use a single tube in place of triodes 69 and 70. Other circuits producing similar integration may be used.

The clipper 22 receives the output from the tube 69 which is controlled as to volume by a volume control 71, and sent to the grid of a triode 70. This triode is operated without grid bias and with a .5 meg. resistance 72 in the grid circuit which serves to clip the positive voltages and take the rounded top off of wave pulse 20. A resistance 73 of 1.0 meg. and a double diode 74 act as a first stage voltage limiter and a resistance and a double diode 76 act as a second stage voltage limiter of a conventional clipping circuit for the production of the rectangular wave pulses 23. I prefer to take double triodes and make double diodes out of them by wiring the grids directly to the plates. Other clipping circuits may be substituted. The number of tubes is such that the phase of the square pulse is positive with respect to the ground.

The tuned amplifier 17 is conventional. I preferably employ a loosely coupled tuned, air core, or iron dust core, transformer as my band pass filter composed preferably of primary coil 77 and secondary coil 78 and condensers 79 and 80. Any other of the many band or high pass filters could be employed. Tube 81 is a part of the tuned amplifier 17 with a rheostat 82 controlling its gain, and thereby controlling the amplitude of the waves 27.

The rectifier and mixer 24 could have been shown as two units, one unit mixing and the other unit acting as a modulated rectifier. Because of the close relation between them, they are shown as a single unit, but because of their separate functions they may be claimed as two separate units.

The mixer portion of the rectifier and mixer 24 consists of a mixing tube 83 in which the voltages of the wave form 27 and the square wave form 23 are added algebraically. The amplitude of the wave 27 is controlled by the rheostat 82, the width of the wave 23 is controlled by the rheostat 71 and the amplitude of the wave 23 is controlled by a rheostat 84. The potential between the cable 25 and the ground follows the square pulse wave pattern 23, and makes the grid of the tube 83 more positive at intervals to cause more plate-to-cathode current in tube 83; and this square pulse current of the tube 83, in passing through coil 78 and condenser 80 has the wave form 27 impressed on it from the primary coil 77. This combined wave train is impressed on the grid of a triode 85.

The rectifier portion of the rectifier and mixer 24 consists of the triode 85 which only transmits the more positive portion of the combined wave form. This is due to a bias placed on the cathode of the rectifier tube 85 by a wire 86. The wire 86 goes to a voltage divider 87 where the $B_2+$ at one end and a resistance 88 and the ground at the other end are so disposed as to make the grid in the tube 85 more negative than the cathode in this tube to prevent the flow of plate current at all times except when the high portion of the square wave makes the grid in 85 more positive than the cathode in that tube. So only the tops of the square wave 23 with wave 27 impressed thereon are transmitted as wave 29 along the cables 30 and 52.

I may use a single envelope containing the two triodes 83 and 85. While the rectifier and mixer portions of 24 are closely tied together it is obvious that they have separate functions, and other mixers and/or rectifiers could be substituted.

The cable 52 transmits the wave 29 to the cathode ray oscillograph tube 53 where it may be observed on screen 54.

The cable 30 transmits the wave 29 to generator 31.

The generator 31 will first be described with the switch 39 to the left so that the contacts 46 and 41; 48 and 42; and 50 and 49 respectively are in contact. In this case the network 31 is a sustained peak voltage generator. Positive current of the wave form 29 runs from the cathode of the triode 85 through a plate 89 and a cathode 90 of a double diode tube 91 to charge a condenser 92. In the circuit shown in Figure 2 I have used a double triode connected as diodes in order to obtain sufficient conductance with the low cost radio receiver type tubes to rapidly charge condensers 92 and 95.

The condenser 92 is preferably of about 0.05 mfd. capacity and can therefore be charged in less than 0.001 of a second by the rectified signal wave 29, so that the peak voltage on this condenser is closely proportional to the peak signal voltage of 29. As a resistance 93 of about 2.0 meg. is all that tends to short the condenser, the duration of the peak voltage on the condenser 92 is appreciably longer than the signal peak so that when the voltage of the condenser 92 is impressed through 43, 41, 46 on the grid of a triode 94, the resulting plate-to-cathode current in the tube is able to charge a condenser 95 of about 2.0 mfd. capacity also shunted by a resistance 96 of about 2.0 meg. which condenser therefore has an increased time constant and maintains its peak voltage to control the grid of a triode 97. The plate-to-cathode current of triode 97 makes the high speed peak meter 37 read the highest peak of the wave train 29 with a slow enough exponential decay of voltage between successive highest peaks so that the human eye can read the high value as the meter hand falls away slowly during the relatively slow discharge of condenser 95. A rheostat 98 provides a zero adjustment for the meter 37.

When the generator 31 is used as an averager, the switch 39 is to the right so that the contacts 41 and 47; 42 and 49; and 40 and 51 are in contact. Then the voltage of the small condenser 92 is applied to the grid of the triode 97 and the plate-to-cathode current of triode 97 makes the high speed averaging meter 38 read the average of the peaks of the wave train 29 for the last few seconds as they appear across condenser 92 and resistor 93. To this end, the meter 38 is shunted by an integrating condenser 99, the integrating effect being regulated by a variable resistor 100 in series with the meter.

Operation

The pickup 4 picks up the wave 9 which includes the valve clatter, ignition spark electromagnetic waves, and the rate of pressure change valves including the high frequency rate of pressure change waves. These are all sent to the amplifier which amplifies them all in a linear manner.

It will be seen that the output 10 of amplifier 8 is proportional to the rate of change of pressure 12, which includes the high frequency oscillations 13 and 14 due to knock, 7 due to spark ignition and 11 and 15 due to valve clatter. This voltage 10 is impressed on an integrating circuit 19 which by the mathematical process of integration (performed electrically, of course) integrates the rate of change of pressure plotted against time of 10 into the pressure plotted against time of 20. The clipper 22 then makes a rectangular wave 23 out of 20 by amplifying to steepen the sides and by cutting off the top of 20. This rectangular voltage-time wave is used to bias the rectifier 85 (Figure 2) in the averager or sustained peak voltage generator so that it is operative only during the interval when considerable pressure exists in the cylinder. This operation removes the voltages 7 due to ignition spark and 11 and 15 due to valve clatter since these voltages appear only when the pressure is low. The parallel channel 16, 28 with the band pass filter 77, 78 in the tuned amplifier 17 removes all the voltages from 10 except 27 which are those corresponding to the excitation of high frequency modes of vibration in the interval between 12,000 and 17,000 cycles per second. The waves 27 are only measured at times when the cylinder pressure is high due to the bias 88 on rectifier 85 and this eliminates the valve clatter, the spark waves and other disturbances occurring when the pressure is lower. Then a function of the peak voltages or the sustained peak voltage of the measured portion of 27 is produced in wave 34 generated in generator 31, depending on the position of the switch 39. When 39 is to the left, sustained peak voltage is generated and measured; when it is to the right, peak voltages are generated and the average thereof is measured. This voltage wave 34 that is measured has exponential decay 36 but in a short interval is replaced by a new wave. Meter 37 thus indicates the peak, or largest knock in the last few seconds, when it is connected. When meter 38 is connected, it indicates the average knocking of the last few seconds.

As pointed out above many changes of circuits following the standard circuits old in the art, and many substitutions of different tubes, conventional elements or units having the same function, may be done by those skilled in the art without involving invention, the scope of my invention being set forth in the following claims.

Having described my invention, I claim:

1. A detonation meter for indicating the intensity of knocking in a cylinder of an internal combustion engine comprising, in combination, a pickup for converting pressure variations within a cylinder into electrical voltages representative thereof, said voltages including a low frequency component representative of the main pressure wave in said cylinder, and high frequency components representative of knocking, a dual channel network fed by said pickup, the first channel including an integrating circuit for converting said low frequency component into waves of generally square wave form, and a clipping circuit to square up the output of the integrating circuit, said second channel including a filter for substantially eliminating said low frequency component to provide a voltage consisting essentially of said high frequency component, a mixing circuit for adding the square wave voltages to the filtered voltages to produce a resultant voltage, a threshold tube for eliminating components of said resultant voltage which are of less than a predetermined amplitude, a diode rectifier tube having an anode and a cathode, means for feeding the output of said threshold tube to the anode of said rectifier tube, a fixed resistance having one terminal thereof connected to said cathode and the other terminal thereof grounded, a condenser connected in parallel with said fixed resistance to form a pulse-generating circuit, an output tube having an anode, a cathode and a control grid, means for supplying operating potentials to the electrodes of said tube, a lead connecting the cathode of said rectifier tube to the control grid of said output tube, a second fixed resistance having one terminal thereof connected to the cathode of said output tube, and a two branch circuit connected between the other terminal of said second fixed resistance and ground, one branch including a fixed resistance and a variable resistance connected in series, and the other branch including a fixed resistance and a meter circuit connected in series therewith, and a fixed resistance connecting the junction between said meter circuit and said last-mentioned fixed resistance to a positive power supply terminal, said meter circuit including an ammeter, a variable resistance connected in series with said ammeter, and an integrating condenser connected in parallel with the variable resistance-ammeter combination.

2. A detonation meter for indicating the intensity of knocking in an internal combustion engine cylinder comprising, in combination, a pickup for converting pressure variations in a cylinder into electrical voltages representative thereof, means for amplifying said voltages, a parallel channel network for the amplified voltages, one channel including an integrator and a clipper to convert said voltages into square waves, said second channel including a filter tuned to a frequency band of from 12,000 to 17,000 cycles per second, a mixing circuit to add the square waves to the filtered voltages, a biased tube for eliminating components of less than a predetermined magnitude in the output of the mixing circuit, a diode rectifier tube having an anode and a cathode, means for feeding the output of said biased tube to the anode of said rectifier tube, a fixed resistance having one terminal thereof connected to said cathode and the other terminal thereof grounded, a condenser connected in parallel with said fixed resistance to form a pulse-generating circuit, an output tube having an anode, a cathode and a control grid, means for supplying operating potentials to the electrodes of said tube, a lead connecting the cathode of said rectifier tube to the control grid of said output tube, a second fixed resistance having one terminal thereof connected to the cathode of said output tube, and a two branch circuit connected between the other terminal of said second fixed resistance and ground, one branch including a fixed resistance and a variable resistance connected in series, and the other branch including a fixed resistance and a meter circuit connected in series therewith, and a fixed resistance connecting the junction between said meter circuit and said last-mentioned fixed resistance to a positive power supply terminal, said meter circuit including an ammeter, a variable resistance connected in series with said ammeter, and an integrating condenser connected in parallel with the variable resistance-meter combination.

RAYMOND G. PIETY.

REFERENCES CITED

The following references are of record in the file of this patent:

UNITED STATES PATENTS

| Number | Name | Date |
|---|---|---|
| 2,337,522 | Eldredge | Dec. 21, 1943 |
| 2,340,714 | Traver et al. | Feb. 1, 1944 |
| 2,416,614 | Crossley et al. | Feb. 25, 1947 |
| 2,448,322 | Piety | Aug. 31, 1948 |